(12) United States Patent
Okabe et al.

(10) Patent No.: US 7,579,707 B2
(45) Date of Patent: Aug. 25, 2009

(54) DISCHARGE PREVENTION CIRCUIT AND ELECTRONIC EQUIPMENT PROVIDED WITH THE DISCHARGE PREVENTION CIRCUIT

(75) Inventors: Yoshiharu Okabe, Tokyo (JP); Takanori Muto, Tokyo (JP)

(73) Assignee: NEC Corporation, Tokyo (JP)

( * ) Notice: Subject to any disclaimer, the term of this patent is extended or adjusted under 35 U.S.C. 154(b) by 19 days.

(21) Appl. No.: 11/433,580

(22) Filed: May 15, 2006

(65) Prior Publication Data
US 2006/0261751 A1 Nov. 23, 2006

(30) Foreign Application Priority Data
May 17, 2005 (JP) ............... 2005-144457

(51) Int. Cl.
*H04B 3/54* (2006.01)
*H02J 3/00* (2006.01)
*H01H 35/00* (2006.01)
*H01H 83/00* (2006.01)
*G06F 13/40* (2006.01)
*H02H 9/00* (2006.01)

(52) U.S. Cl. ............... 307/7; 307/17; 307/116; 307/134; 361/58

(58) Field of Classification Search ............... None
See application file for complete search history.

(56) References Cited
U.S. PATENT DOCUMENTS
7,256,701 B2 * 8/2007 Kono et al. ............... 340/648

FOREIGN PATENT DOCUMENTS

| JP | 53-124741 A | 10/1978 |
|---|---|---|
| JP | 7-261860 A | 10/1995 |
| JP | 2002-315201 | 10/2002 |

OTHER PUBLICATIONS

Tawara Hiromitsu, Discharge Prevention Circuit, Oct. 25, 2002, par. 0019-0032.*
Taware Hiromitsu, Discharge Prevention circuit, Oct. 25, 2002, par. 0019-0032.*

* cited by examiner

*Primary Examiner*—Albert W Paladini
*Assistant Examiner*—Dharti Patel
(74) *Attorney, Agent, or Firm*—Sughrue Mion, PLLC

(57) ABSTRACT

A discharge prevention circuit and electronic equipment with the discharge prevention circuit are provided. The discharging prevention circuit includes a first power line, a second power line, a capacitor, a current detector and a switch. The first and second power lines directly or indirectly connect a power feed line to a load. The capacitor and the current detector are directly or indirectly connected in series between the first and second power lines. The switch is disposed in the first or second power line. The current detector detects at least charging current to the capacitor and discharging current from the capacitor. And if the current detector detects discharging current from the capacitor, the switch acts to stop current flow between the capacitor and the power feed line through the switch.

23 Claims, 10 Drawing Sheets

DISCHARGE PREVENTION CIRCUIT AND ELECTRONIC EQUIPMENT PROVIDED WITH THE DISCHARGE PREVENTION CIRCUIT

CROSS-REFERENCE TO RELATED PATENT APPLICATION

This application claims the priority from Japanese Patent Application No. 144457/2005, filed on May 17, 2005, in the Japanese Patent Office, the disclosure of which is incorporated herein by reference in its entirety.

BACKGROUND OF THE INVENTION

The invention relates to a discharge prevention circuit, electronic equipment provided with the discharge prevention circuit, and, in particular, to a discharge prevention circuit for preventing a capacitor from being discharged. The invention may be used in a system where a DC power supply voltage is supplied from a power feed line to electronic equipment having the capacitor for storing energy at the power input, and similar electronic equipment may be sequentially and additionally connected to or disconnected from the power feed line.

As the demand for cellular phones and connection with the Internet have increased in recent years, communication companies such as Internet service providers, and telephone communication companies continue to install add-on units of communication equipment. And the number of add-on units is increasing. In general, DC power is supplied from a power unit to the respective units of communication equipment via a power feed line. In this case, the number of units of the communication equipment connectable to one power unit is limited by the power supply capacity of the power unit and the power consumption of the respective units of communication equipment. In general, a large-capacitance capacitor for storing energy is often incorporated at the power input portion of each unit of communication equipment. When an add-on unit of communication equipment is sequentially and additionally connected to a power feed line while a DC power supply voltage is supplied from the power feed line to already installed units of the communication equipment, a capacitor incorporated in the power input portion of the add-on unit of the communication equipment is charged, and then, the DC power supply voltage of the power feed line momentarily drops, thereby causing at times a problem in that the already installed units of the communication equipment stop operation, resulting in stoppage of operation of communication service. As a countermeasure for this problem, there is available a discharge prevention circuit as disclosed in Japanese Laid-open Patent No. 315201/2002 (in particular, page 1 to 2, drawings: FIGS. 1 and 4)

FIG. 1 is a circuit diagram showing an electrical configuration of the principal part of electronic equipment provided with a discharge prevention circuit disclosed in Japanese Laid-open Patent No. 315201/2002.

The electronic equipment is communication equipment 10, connected to a DC power unit 1 via a power feed line 2, having a capacitor 11 installed in a power input portion. A DC power supply voltage $V_{in}$ from the DC power unit 1 is applied to the capacitor 11 and charge the capacitor 11 so that the voltage of the capacitor 11 is substantially the same voltage as the DC power supply. The capacitor 11 also supplies power to a load 12. The load 12 may be internal circuits such as transmitters, receivers and processors of the communication equipment 10. Further, the communication equipment 10 is provided with a diode 13 so that a discharge prevention circuit is realized. In the case that the voltage of the DC power supply $V_{in}$ momentarily drops, for example, by connecting additional communication equipment to the power feed line 2, the diode 13 prevents reverse current flow from the capacitor 11 to power feed line 2.

The communication equipment 10 has a simple configuration, as shown in FIG. 1. In the communication equipment 10, the diode 13, which is a passive element, is used as the discharge prevention circuit. Therefore, a complicated control circuit is not necessary in this configuration. However, with this discharge prevention circuit, assuming that a load current is $I_o$ and a forward voltage of the diode 13 is $V_f$, electric power of $I_o \times V_f$ is always consumed. For this reason, the diode 13 needs to have a configuration comprising a plurality of diodes connected in parallel and needs to have effective heat dissipation capacity such as a large-size heat sink, therefore the volume of the configurations has to be large. Accordingly, it is difficult to provide equipment consuming a lot of power with the discharge prevention circuit disclosed in Japanese Laid-open patent No. 315201/2002.

FIG. 2 is a circuit diagram showing an electrical configuration of the principal part of electronic equipment provided with another discharge prevention circuit disclosed in Japanese Laid-open Patent No. 315201/2002. In FIG. 2, elements in common with those in FIG. 1 are denoted by similar reference numerals.

The electronic equipment is communication equipment 10A, connected to a DC power unit 1 via a power feed line 2. With the communication equipment 10A, there is provided a discharge prevention circuit comprising a current transformer 14, a control circuit 15, and an n-channel enhancement MOSFET 16 in place of the diode 13 in FIG. 1.

In the communication equipment 10A, the MOSFET 16 is in the ON state during steady state (at times except with the voltage of the capacitor 11 is lower than the normal DC power supply voltage due to a temporary drop in the DC power supply voltage), and while a DC power supply voltage $V_{in}$ from the DC power unit 1 is applied to a capacitor 11 via the current transformer 14 to thereby charge the capacitor 11, power is supplied to a load 12. When the DC power supply voltage $V_{in}$ momentarily drops upon connection of equipment similar to the communication equipment 10 to the power feed line 2, reverse current begins to flow from the capacitor 11 to the power feed line 2. However, this current from the capacitor 11 is then detected by the current transformer 14, and the current transformer 14 outputs a reverse-flow detection signal. The reverse-flow detection signal a is inputted to the control circuit 15, and a control signal b is outputted from the control circuit 15. The MOSFET 16 is turned into the OFF state by the control signal b, and then the reverse flow of the current from the capacitor 11 to the power feed line 2 is prevented, thereby preventing the capacitor 11 from being discharged. Specifically, when the voltage between source and gate of the MOSFET 16 is high level, the MOSFET 16 is the ON state. On the other hand, the voltage between source and gate of the MOSFET 16 is low level, the MOSFET 16 is the OFF state. Further, at the time of the steady state, there occurs a loss due to on-resistance of the MOSFET 16, but heat generation is significantly less in comparison with the case of the discharge prevention circuit using the diode 13 shown in FIG. 1.

However, the related discharge prevention circuits described as above have the following problems. In the discharge prevention circuit of FIG. 2, the large current in the steady state and the momentary changing current have to be taken into account for circuit designing, because the current transformer 14 is connected in the main current line (between the DC power unit 1 and the load 12). Furthermore, power consumption happens at the current transformer 14, because a large DC current (as well as a momentary changing current) constantly flows through the current transformer 14 due to the configuration in which a large scale current transformer 14 is disposed between the power feed line 2 and the load 12.

SUMMARY OF THE INVENTION

The invention has been developed in view of circumstances as described in the foregoing, and it is one of the objects of the invention to provide a discharge prevention circuit which may use a small current transformer. It is also another object of the invention to provide a small scale discharge prevention circuit and provide a discharge prevention circuit which consumes less energy.

According to an aspect of the present invention, the discharging prevention circuit includes a first power line, a second power line, a capacitor, a current detector and a switch. The first and second power lines directly or indirectly connect a power feed line to a load. The capacitor and the current detector are directly or indirectly connected in series between the first and second power lines. The switch is disposed in the first or second power line. The current detector detects at least charging current to the capacitor and discharging current from the capacitor. And if the current detector detects discharging current from the capacitor, the switch acts to stop current flow between the capacitor and the power feed line through the switch.

According to another aspect of the invention, the discharging prevention circuit may further include a controller. If the current detector detects discharging current from the capacitor, the controller receives a control signal from the current detector and controls the switch to stop the current flow between the capacitor and the power feed line through the switch.

According to another aspect of the invention, in the discharging prevention circuit, the current detector may include a current transformer.

According to another aspect of the invention, in the discharging prevention circuit, after the switch acts to stop current flow between the capacitor and the power feed line through the switch, after the current detector then detects charging current to the capacitor, and after subsequently waiting a predetermined period of time, the switch may act to allow current flow between the capacitor and the power feed line through the switch.

According to another aspect of the invention, the discharging prevention circuit may further include a controller. If the current detector detects discharging current from the capacitor, the controller receives a first control signal from the current detector and controls the switch to stop current flow between the capacitor and the power feed line through the switch. And if the current detector detects charging current to the capacitor, the controller receives a second control signal from the current detector and controls the switch to allow current flow between the capacitor and the power feed line through the switch.

According to another aspect of the invention, the discharging prevention circuit may further include a rush-current prevention circuit. The capacitor, the current detector and the rush-current prevention circuit may be directly or indirectly connected in series in any order between the first and second power lines.

According to another aspect of the invention, in the discharging prevention circuit, the rush-current prevention circuit may include a resistor and a diode. The resistor and the diode are disposed in parallel.

According to another aspect of the invention, the discharging prevention circuit, the rush-current prevention circuit may include a supplemental switch and a resistor. The supplemental switch and the resistor are disposed in parallel.

According to another aspect of the invention, in the discharging prevention circuit, if the current detector detects charging current to the capacitor, the controller receives a third control signal from the current detector and controls the supplemental switch to stop current flow through the supplemental switch. And if the current detector detects discharging current from the capacitor, the controller receives a fourth control signal from the current detector and controls the supplemental switch to allow current flow through the supplemental switch.

According to another aspect of the invention, the electronic equipment includes a load and a discharging prevention circuit. The discharging prevention circuit may includes a first power line, a second power line, a capacitor, a current detector and a switch. The first and second power lines directly or indirectly connect a power feed line to a load. The capacitor and the current detector are directly or indirectly connected in series between the first and second power lines. The switch is disposed in the first or second power line. The current detector detects at least charging current to the capacitor and discharging current from the capacitor, and if the current detector detects discharging current from the capacitor, the switch acts to stop current flow between the capacitor and the power feed line through the switch.

According to another aspect of the invention, the electronic equipment may further include a controller. If the current detector detects discharging current from the capacitor, the controller receives a control signal from the current detector and controls the switch to stop the current flow between the capacitor and the power feed line through the switch.

DETAILED DESCRIPTION OF THE EXEMPLARY EMBODIMENTS

Hereinafter, exemplary embodiments of the present invention will now be described in detail with reference to the accompanying drawings. The described exemplar embodiments are intended to assist in understanding the invention, and are not intended to limit the scope of the invention in any way.

According to one of the aspect of the invention, a discharge prevention circuit wherein a MOSFET (a switching means) is turned into the OFF state when a discharge current of a capacitor is detected by a current transformer, thereby turning a state of connection between the capacitor and a power feed line into the OFF state.

Figure 1:
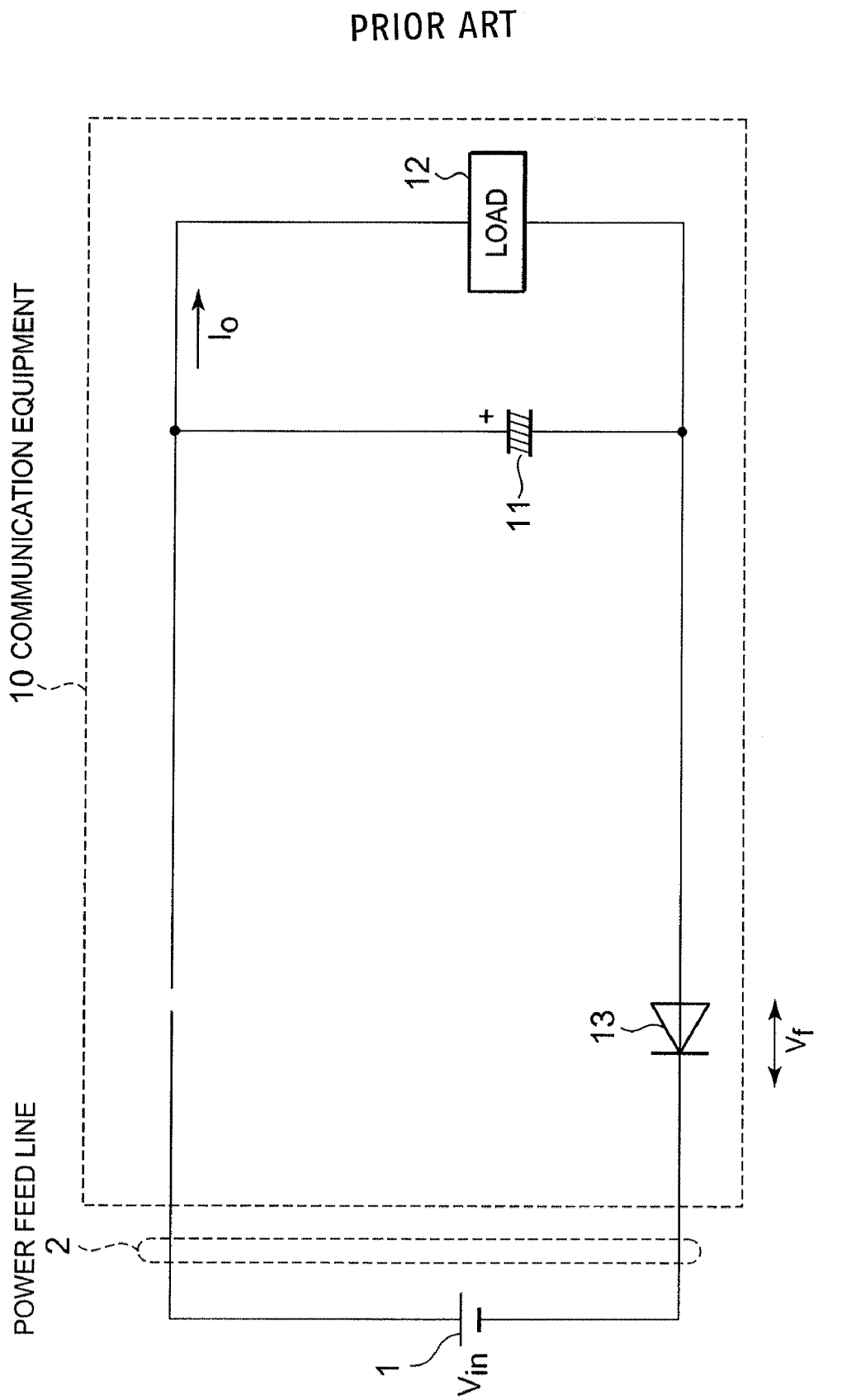
FIG. 1 is a circuit diagram showing an electrical configuration of the principal part of electronic equipment provided with a related discharge prevention circuit.
Figure 2:
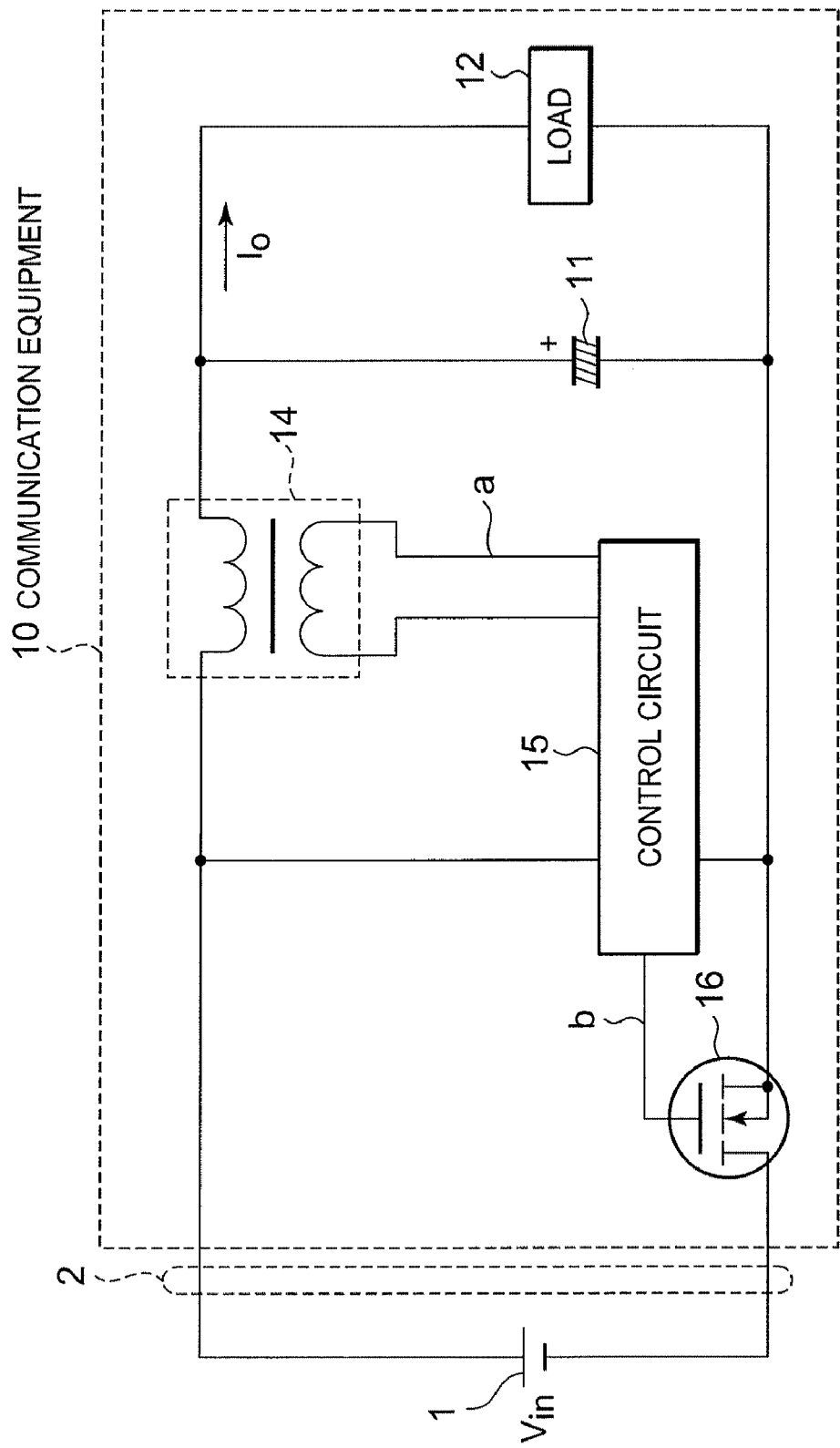
FIG. 2 is a circuit diagram showing an electrical configuration of the principal part of electronic equipment provided with another related discharge prevention circuit.
Figure 3:
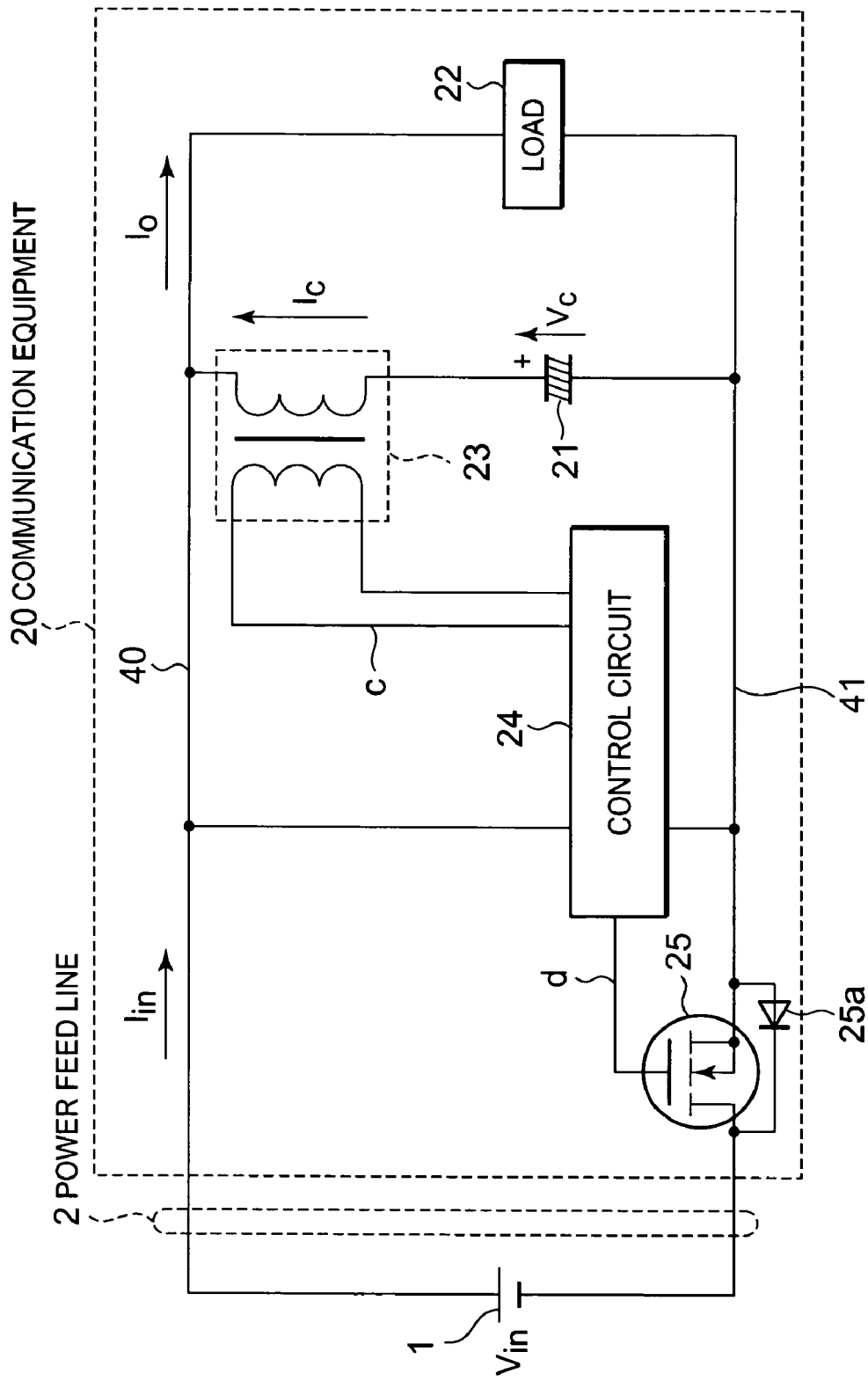
FIG. 3 is a circuit diagram showing an electrical configuration of the principal part of electronic equipment provided with a first exemplary embodiment of a discharge prevention circuit according to the invention.

FIG. 3 is a circuit diagram showing an electrical configuration of the principal part of electronic equipment provided with a first exemplary embodiment of a discharge prevention circuit.

As shown in the FIG. 3, the electronic equipment according to the first exemplary embodiment is communication equipment 20 connected to a DC power unit 1 via a power feed line 2, comprising a capacitor 21. The capacitor 21 is charged when a DC power supply voltage $V_{in}$ from the DC power unit 1 is applied thereto via power feed line 2 and first and second lines 40, 41, and also the capacitor 21 supplies power to a load 22 which comprises internal circuits, such as transmitters, receivers and processors, of the communication equipment 20. Further, the communication equipment 20 is provided with a discharge prevention circuit comprising a current transformer 23, a control circuit 24, and an n-channel MOSFET 25.

The current transformer 23 is connected in series to the capacitor 21 in such a way as to enable charge/discharge current of the capacitor 21 to flow only on the primary winding side of the current transformer 23 to thereby detect a discharge current of the capacitor 21, generating a discharge current detection signal c on the secondary winding side of the current transformer 23 to be outputted. The control circuit 24 generates a control signal d for turning the MOSFET 25 into the OFF state, based on the discharge current detection signal c. The control circuit 24 may comprise analog control circuits, microprocessor and so forth. The MOSFET 25 keeps a channel between source•drain in the ON state during a steady state period, but turns a state of connection between the capacitor 21 and a power feed line 2 into the OFF state, based on the discharge current detection signal c. Further, the MOSFET 25 has a parasitic diode 25a.

Figure 4:
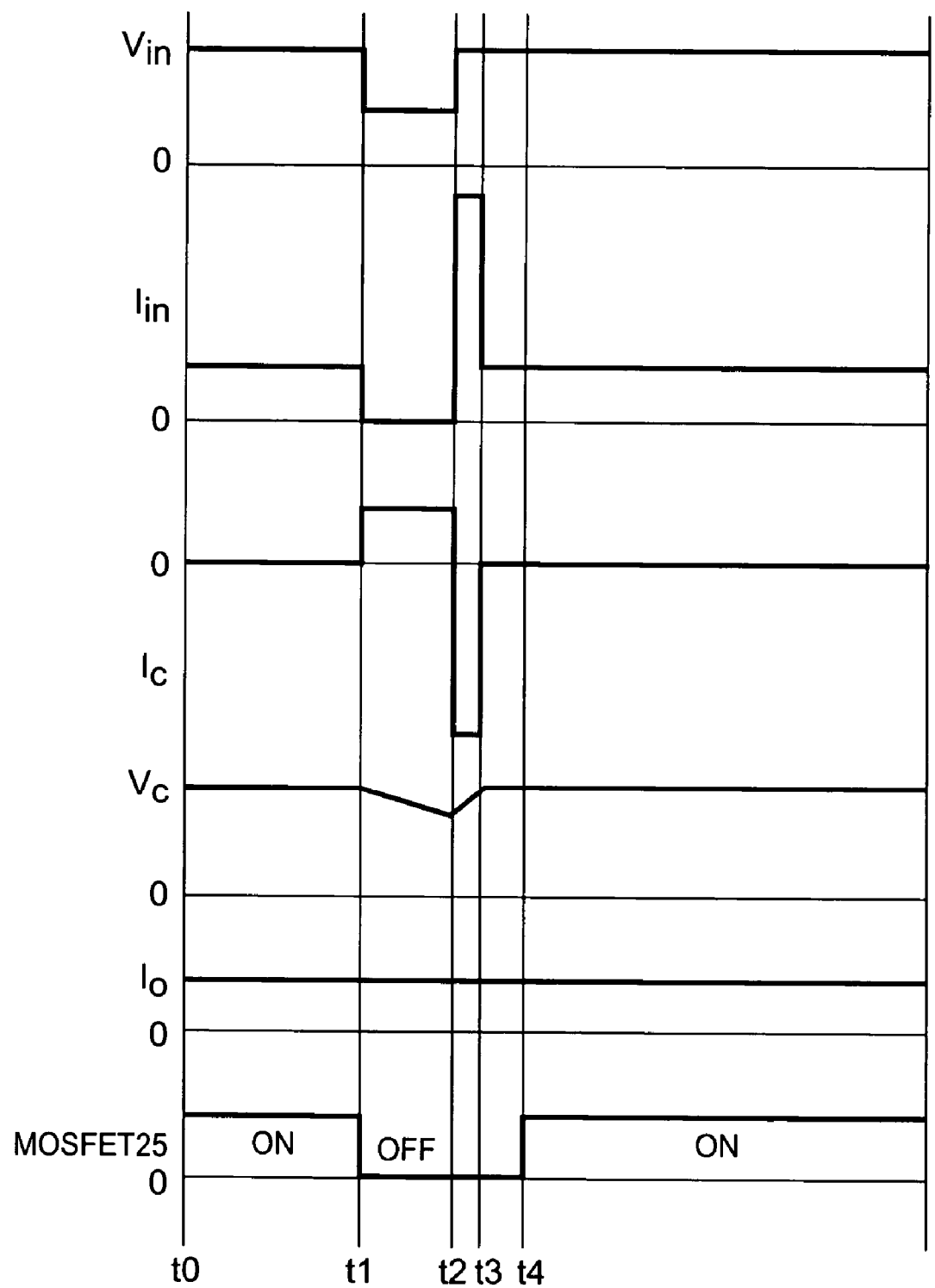
FIG. 4 is a time chart for describing an operation of the discharge prevention circuit shown in FIG. 3.

FIG. 4 is a time chart for describing an operation of the discharge prevention circuit shown in FIG. 3.

The operation of the discharge prevention circuit according to the present exemplary embodiment is described hereinafter with reference to FIG. 4.

When an add-on unit (not shown) of communication equipment is sequentially and additionally connected to the power feed line 2 while the DC power supply voltage $V_{in}$ is supplied from the power feed line 2 to the communication equipment 20, a capacitor incorporated in a power input portion of the newly connected add-on unit of the communication equipment begins to be charged, so that the DC power supply voltage $V_{in}$ momentarily drops. At this point in time, the discharge prevention circuit detects start of discharge on the basis of a discharge current $I_c$ of the capacitor 21, whereupon the state of the connection between the capacitor 21 and the power feed line 2 is turned into the OFF state by the MOSFET 25.

As shown in FIG. 4, because the capacitor 21 is in the state where it is charged within a steady state time period (from the time t0 to t1), the charge/discharge current (that is, the current on the primary winding side of the current transformer 23) does not flow. Accordingly, an input current $I_{in}$=a load current $I_o$, and the MOSFET 25 is kept in the ON state under control by the control circuit 24 in the steady state. Upon occurrence of a momentary drop in the DC power supply voltage $V_{in}$ during a hit (momentarily low) period (from the time t1 to t2), power is supplied from the capacitor 21 to the load 22 in stead of the DC power supply. The discharge current $I_c$ is then detected by the current transformer 23, and the discharge current detection signal c generated on the secondary winding side of the current transformer 23 is transmitted to the control circuit 24. The control signal d is outputted from the control circuit 24, thereby turning the MOSFET 25 into the OFF state. As a result, there is no longer a route through which power stored in the capacitor 21 is drawn out toward the power feed line 2, therefore all the power of the capacitor 21 is supplied to the load 22, whereupon a voltage $V_c$ of the capacitor 21 drops gradually.

During a charge period (from the time t2 to t3) in which the DC power supply voltage $V_{in}$ is recovered from dropping, power is supplied from the power feed line 2 to the load 22 and the charge current flows to the capacitor 21 whose voltage $V_c$ has been lowered due to previous discharging. At this point in time, the MOSFET 25 remains in the OFF state by the agency of the control signal d, but the charge current keeps flowing through the parasitic diode 25a of the MOSFET 25. During a discharge prevention circuit recovery period (from the time t3 to t4), the MOSFET 25 that has been kept in the OFF state by the agency of the control signal d, reverts to the ON state at the time t4. The time period t3-t4 may be set or changed by the control circuit 24. For example, the control circuit 24 may have a memory in which the time period t3-t4 is specified. And the control circuit 24 turn on the MOSFET 25 after the predetermined time has passed after the charging current had stopped. For another example, the delay circuit which has a capacitor and a resister may be disposed between the control circuit 24 and the gate of the MOSFET 25 so that the time delay after the charging current has stopped is realized. During a steady state time period (the time t4, and onwards), the discharge prevention circuit reverts to the same state as that during the steady state time period (from the time t0 to t1).

As described in the foregoing, with the first exemplary embodiment, upon the current transformer 23 detecting the discharge current $I_c$ of the capacitor 21, the MOSFET 25 is turned into the OFF state, thereby turning the state of the connection between the capacitor 21 and the power feed line 2 into the OFF state. Accordingly, only a momentary current flows through the current transformer 23, and there is no need for taking into consideration a superimposed component of the DC current flowing in the steady state, so that the current transformer 23 may be small in size. Furthermore, since there may be no constituent member to be inserted in a main current line, losses as a whole would become small.

Figure 5:
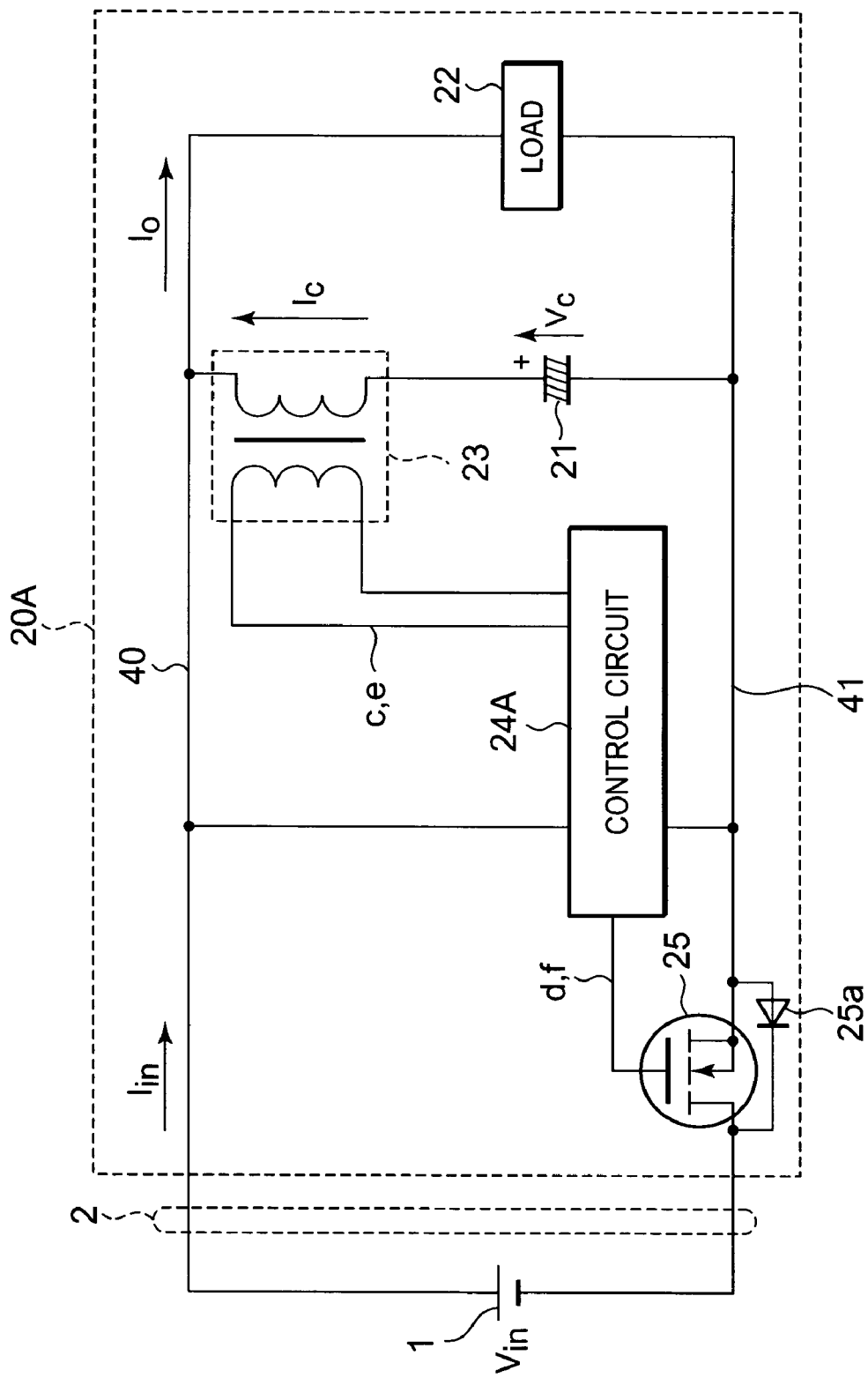
FIG. 5 is a circuit diagram showing an electrical configuration of the principal part of electronic equipment provided with a second exemplary embodiment of a discharge prevention circuit according to the invention.

FIG. 5 is a circuit diagram showing an electrical configuration of the principal part of electronic equipment provided with a second exemplary embodiment of a discharge prevention circuit according to the invention. And in the figure, elements in common with those in FIG. 3 showing the first exemplary embodiment are denoted by like reference numerals.

The electronic equipment according to the present exemplary embodiment is communication equipment 20A connected to a DC power unit 1 via a power feed line 2 as shown in FIG. 5, and the communication equipment 20A is provided with a control circuit 24A with a new function added thereto, in place of the control circuit 24 in FIG. 3. Further, a current transformer 23 detects a charge current to a capacitor 21 and generates a charge current detection-signal e on the secondary winding side thereof to be then outputted. The current transformer 23 also detects a discharge current from the capacitor 21 and generates a discharge current detection-signal c on the secondary winding side thereof. The control circuit 24A generates a control signal f for turning a MOSFET 25 into the ON state based on the charge current detection-signal e, and also generates a control signal d for turning the MOSFET 25 into the OFF state based on the discharge current detection signal c. The MOSFET 25 turns a state of connection between the capacitor 21 and a power feed line 2 into the ON state based on the control signal f, and also shorts a parasitic diode 25a and turns the state of the connection between the capacitor 21 and the power feed line 2 into the OFF state based on the control signal d.

Figure 6:
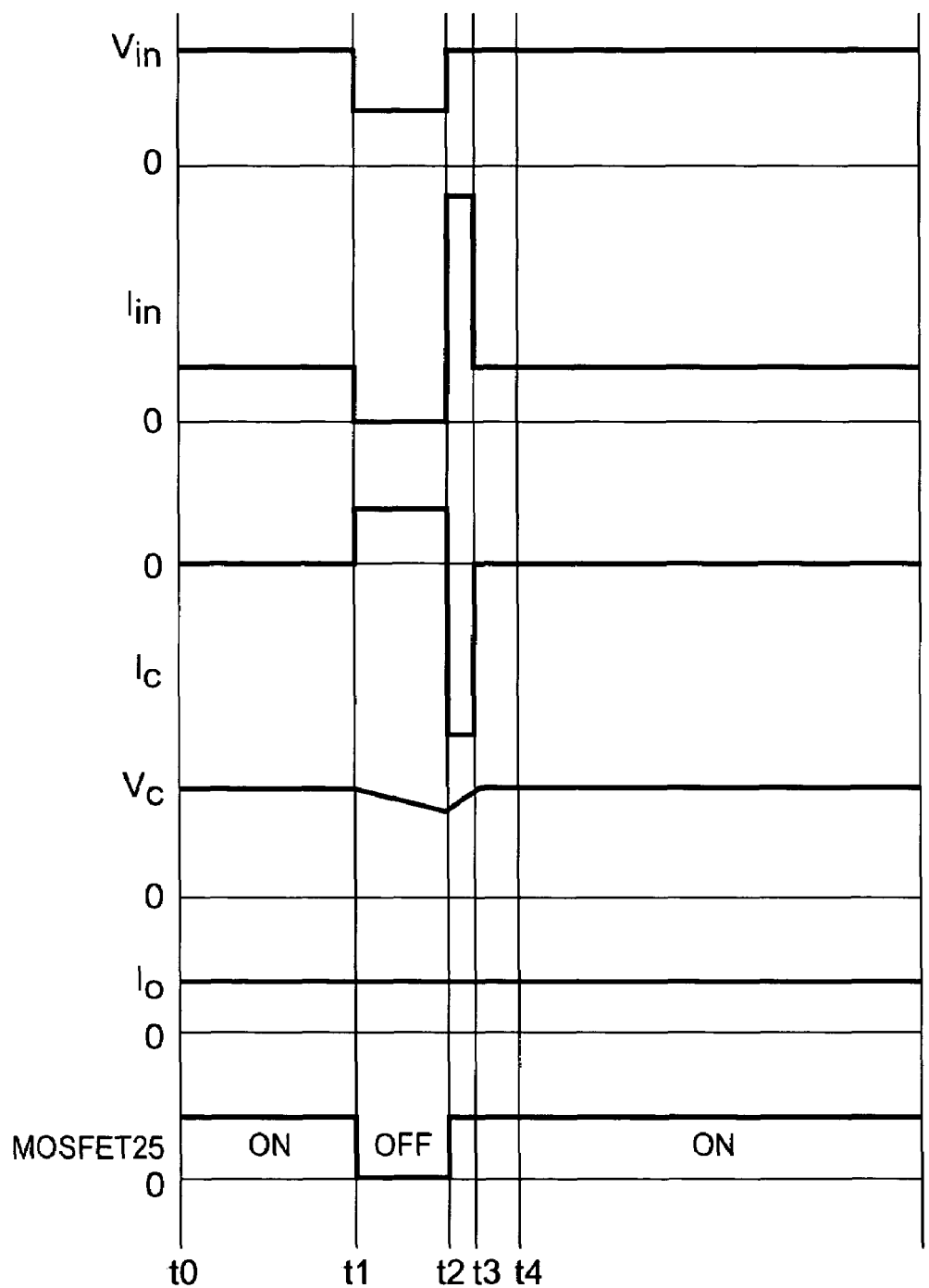
FIG. 6 is a time chart for describing an operation of the discharge prevention circuit shown in FIG. 5.

FIG. 6 is a time chart for describing an operation of the discharge prevention circuit shown in FIG. 5.

The operation of the discharge prevention circuit according to the present exemplary embodiment is described hereinafter with reference to FIG. 6.

As shown in FIG. 6, with the discharge prevention circuit, the charge current detection-signal e is generated on the secondary winding side of the current transformer 23 during a charge period (from the time t2 to t3), and the control circuit 24A generates the control signal f for turning the MOSFET 25 into the ON state, based on the charge current detection-signal e. Accordingly, the MOSFET 25 that has been turned into the OFF state by the agency of the control signal d is caused to revert to the ON state at the time t2 earlier than the time t4 in FIG. 4. As a result, a loss ($I_o \times V_f$, $V_f$: a forward voltage of the parasitic diode 25a) occurring when the MOSFET 25 is in the OFF state is reduced.

Figure 7:
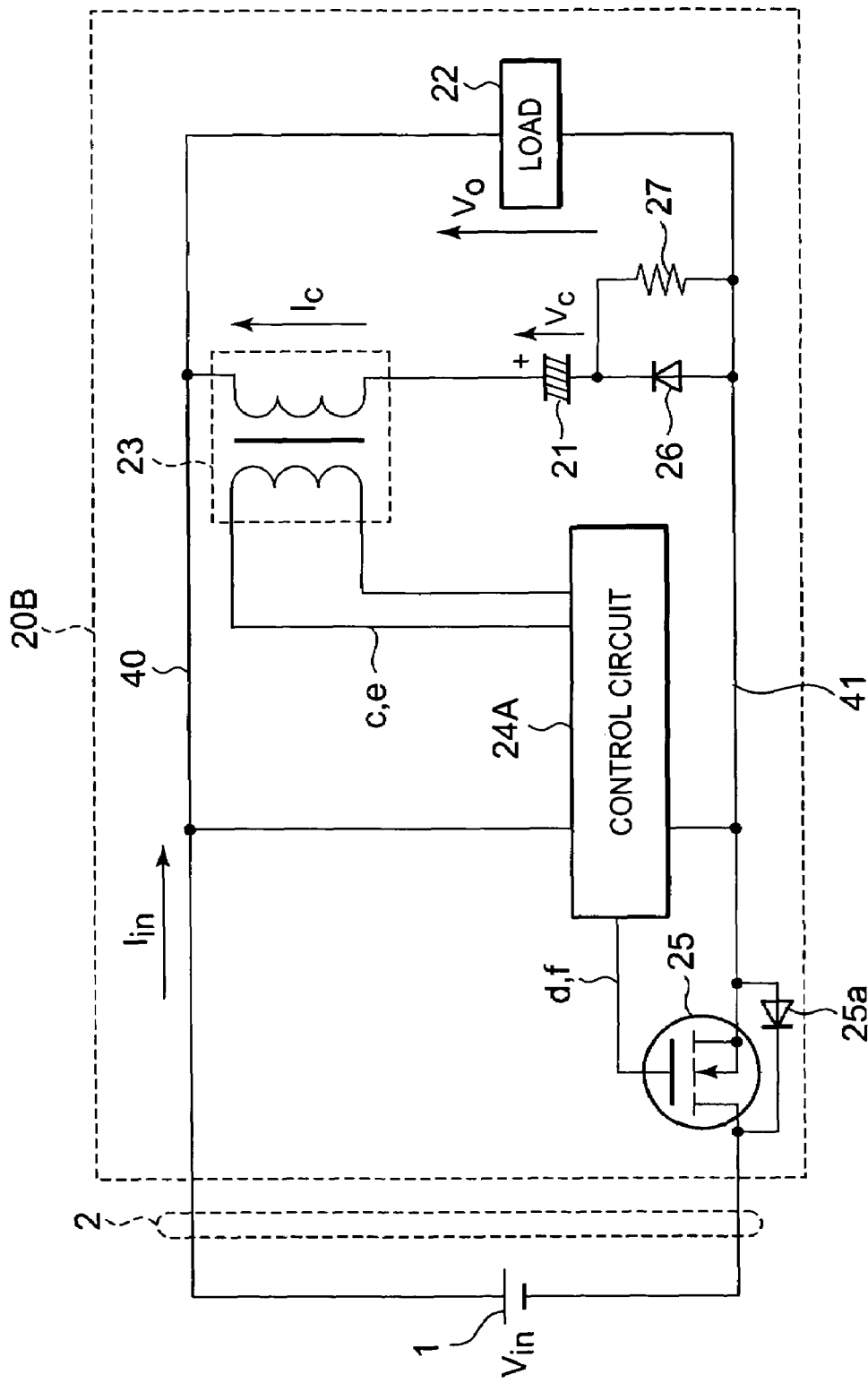
FIG. 7 is a circuit diagram showing an electrical configuration of the principal part of electronic equipment provided with a third exemplary embodiment of a discharge prevention circuit according to the invention.

FIG. 7 is a circuit diagram showing an electrical configuration of the principal part of electronic equipment provided with a third exemplary embodiment of a discharge prevention circuit according to the invention. And in the figure, elements in common with those in FIG. 5 showing the second exemplary embodiment are denoted by like reference numerals.

The electronic equipment according to the present exemplary embodiment is communication equipment 20B connected to a DC power unit 1 via a power feed line 2 as shown in FIG. 7. With the communication equipment 20B, a diode 26 is connected in series to a capacitor 21, and a resistor 27 is parallel-connected to the diode 26. The resistor 27 limits a charge current to the capacitor 21. The diode 26 causes a discharge current of the capacitor 21 to bypass the resistor 27. A rush current prevention circuit is made up of the diode 26 and the resistor 27.

Figure 8:
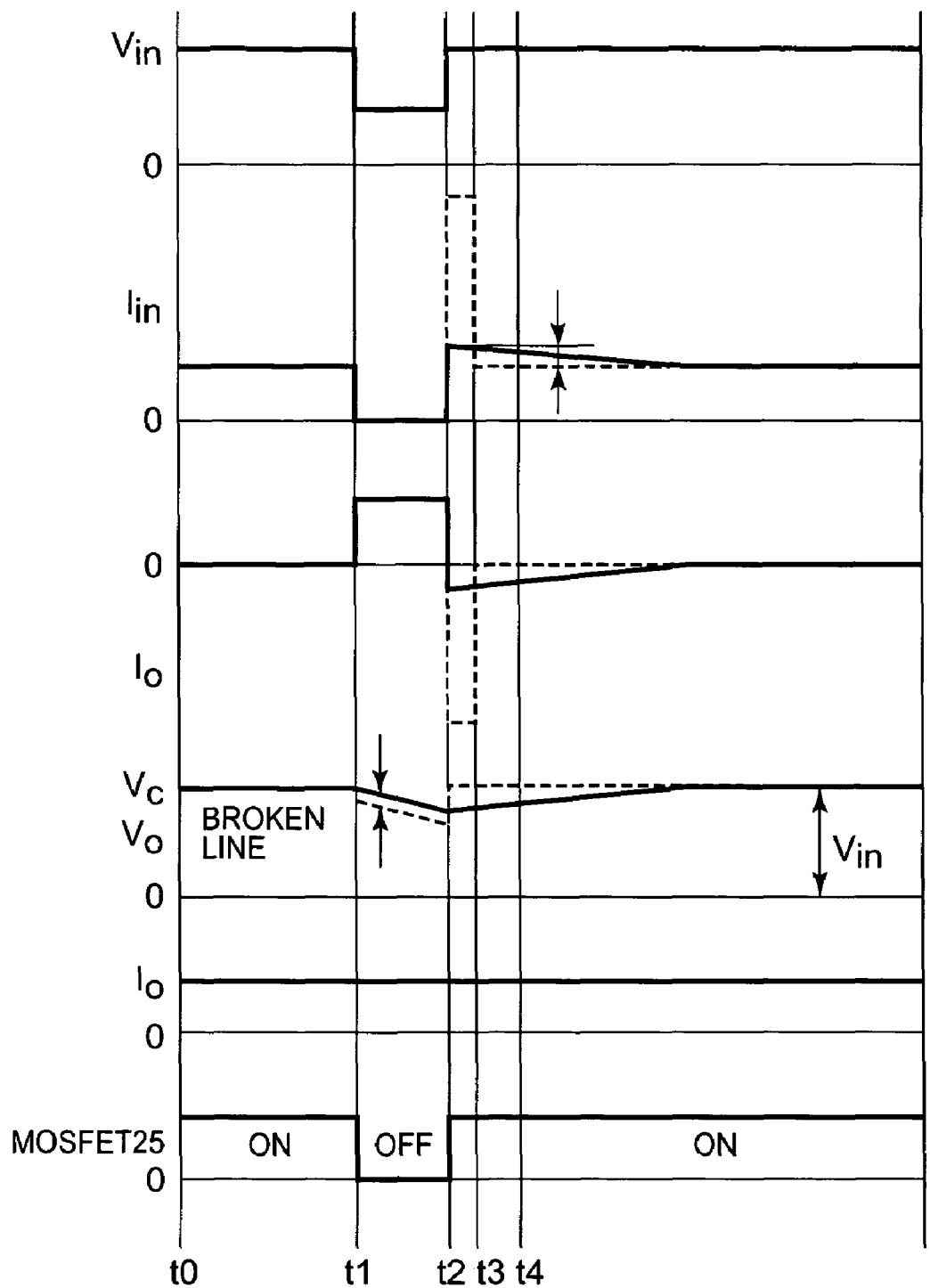
FIG. 8 is a time chart for describing an operation of the discharge prevention circuit shown in FIG. 7.

FIG. 8 is a time chart for describing an operation of the discharge prevention circuit shown in FIG. 7.

The operation of the discharge prevention circuit according to the present exemplary embodiment is described hereinafter with reference to FIG. 8.

As shown in FIG. 8, with the discharge prevention circuit, an excessive charge current for the capacitor 21 is reduced during a charge period (from the time t2 to t3). By the way, in general, there is a time gap between the time when the control signal f outputs from the control circuit 24 and the time when the control circuit 24 detects the control signal d, because it takes a time for the control circuit 24 to relay or process the control signal f. Therefore, during that time difference, a loss happens at the MOSFET 25 because current flows through the parasitic diode 25a even if the MOSFET 25 is the OFF state. In the configuration of FIG. 8, the loss occurring when a MOSFET 25 is in the OFF state can be further reduced. However, with the present exemplary embodiment, a voltage $V_o$ applied to a load 22 during a hit period (from the time t1 to t2) becomes lower in value than a voltage $V_c$ of the capacitor 21 by a forward voltage (about 0.6V) of the diode 26.

Figure 9:
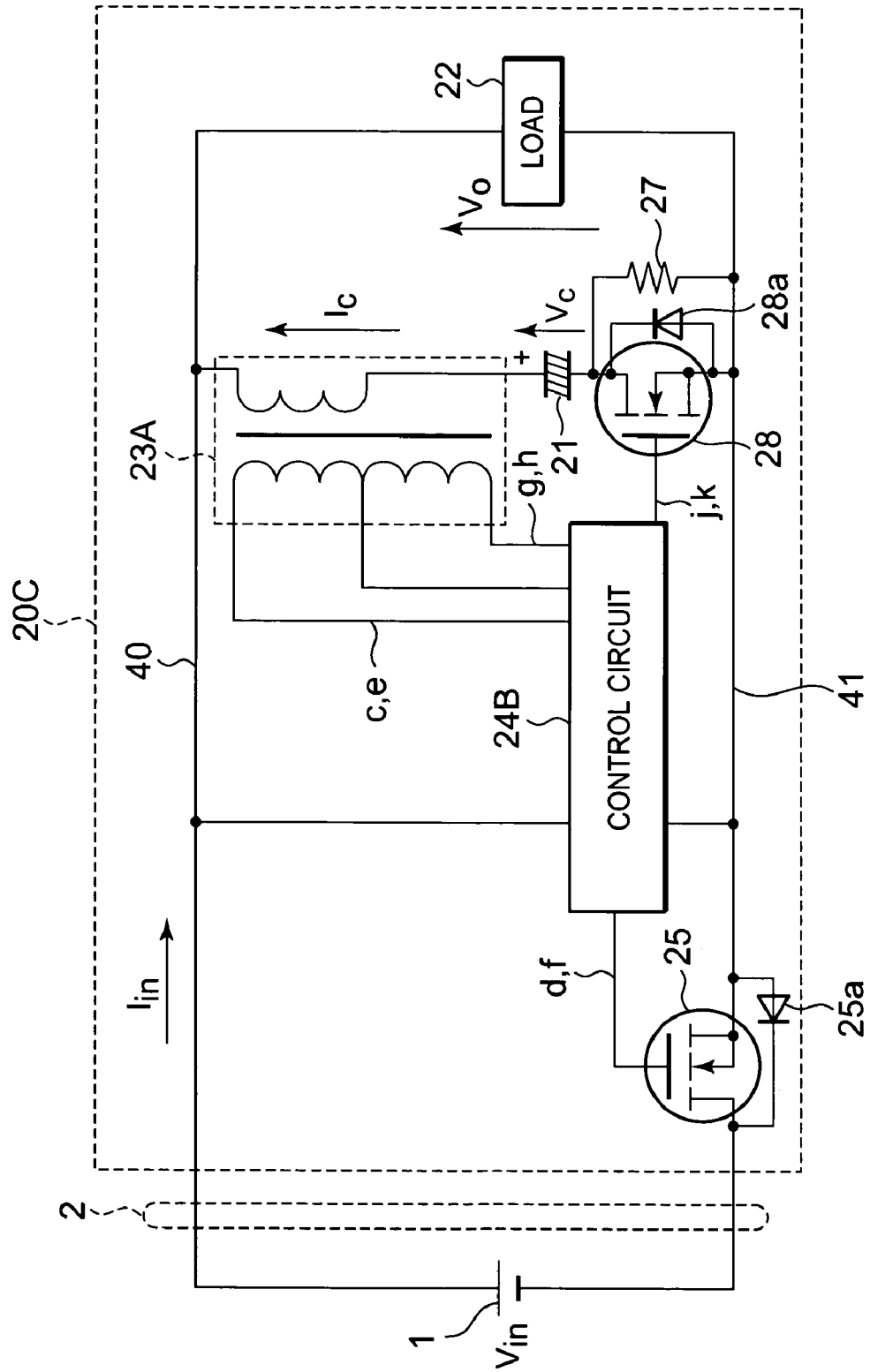
FIG. 9 is a circuit diagram showing an electrical configuration of the principal part of electronic equipment provided with a fourth exemplary embodiment of a discharge prevention circuit according to the invention.

FIG. 9 is a circuit diagram showing an electrical configuration of the principal part of electronic equipment provided with a fourth exemplary embodiment of a discharge prevention circuit according to the invention.

The electronic equipment according to the present exemplary embodiment is communication equipment 20C connected to a DC power unit 1 via a power feed line 2 as shown in FIG. 9. The communication equipment 20C is provided with a current transformer 23A, a control circuit 24B, and a MOSFET 28, in place of the current transformer 23, control circuit 24A, and diode 26, shown in FIG. 7. The current transformer 23A detects a charge current to a capacitor 21 and generates a charge current detection-signal g, and also detects a discharge current from the capacitor 21 and generates a discharge current detection-signal h, in addition to the function of the current transformer 23. The control circuit 24B generates a control signal j corresponding to the charge current detection-signal g, and generates a control signal k corresponding to the discharge current detection-signal h, in addition to the function of the control circuit 24A. The MOSFET 28 has a parasitic diode 28a. The parasitic diode 28a serves as a discharge current passing means for causing the discharge current from the capacitor 21 to pass therethrough. Further, the MOSFET 28 is turned into the OFF state, based on the control signal j, and is turned into the ON state, based on the control signal k, to thereby short-circuiting a resistor 27 and the parasitic diode 28a.

Figure 10:
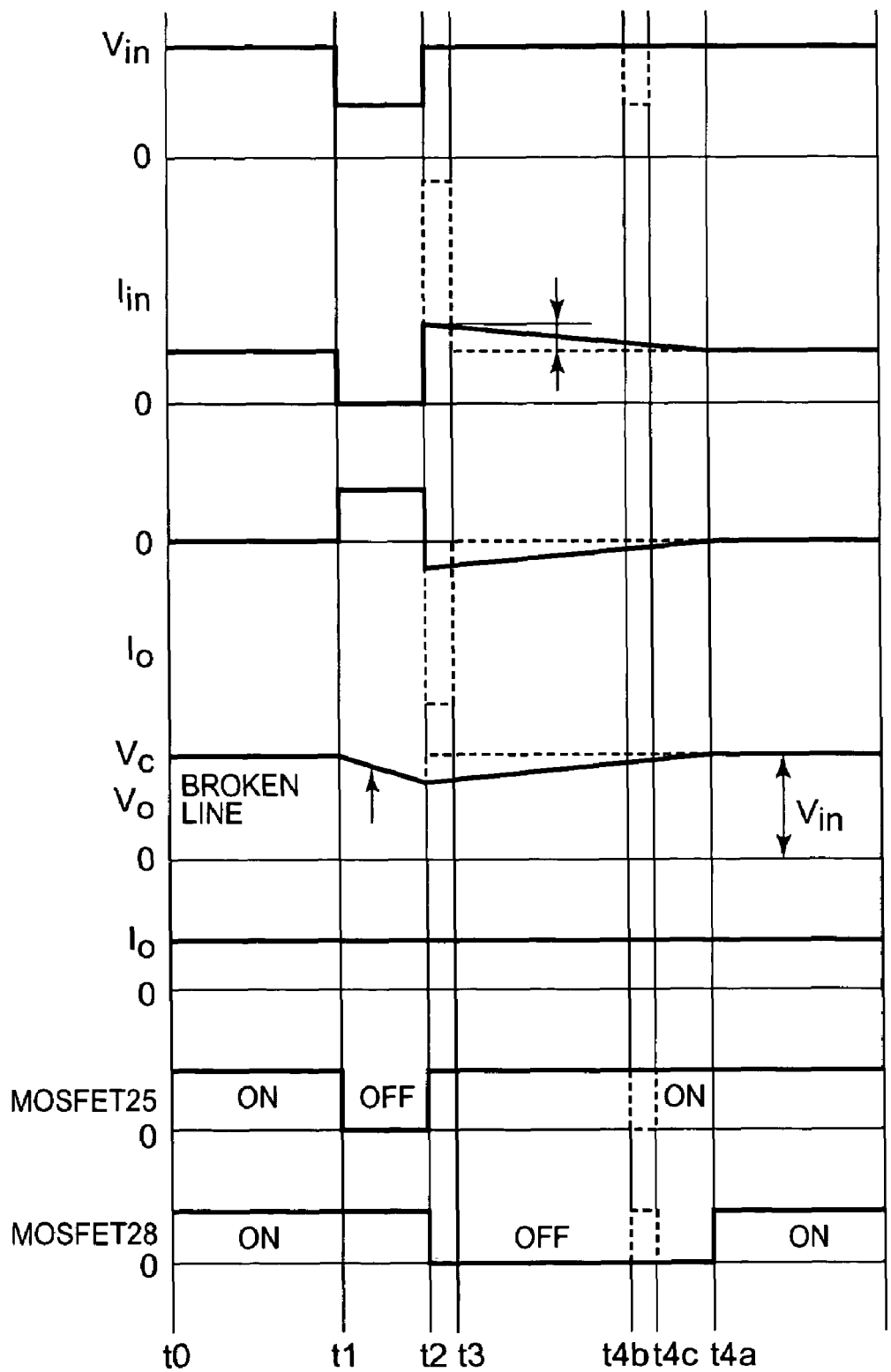
FIG. 10 is a time chart for describing an operation of the discharge prevention circuit shown in FIG. 9.

FIG. 10 is a time chart for describing an operation of the discharge prevention circuit shown in FIG. 9.

The operation of the discharge prevention circuit according to the present exemplary embodiment is described hereinafter with reference to FIG. 10.

As shown in FIG. 10, with the discharge prevention circuit, as the MOSFET 28 is in the ON state during a hit period (from the time t1 to t2), a voltage $V_o$ applied to a load 22 becomes identical to a voltage $V_c$ of the capacitor 21. Accordingly, it never happens that a time length for backup by the capacitor 21 will become shorter as explained third exemplary embodiment. Further, at the time t2, the current transformer 23A detects the charge current to the capacitor 21 to thereby generate the charge current detection-signal g, and the control circuit 24B generates the control signal j corresponding to the charge current detection-signal g, thereby turning the MOSFET 28 into the OFF state. Thereafter, at the time t4a, completion of charging the capacitor 21 is detected, whereupon the MOSFET 28 is turned into the ON state. Further, if a DC power supply voltage $V_{in}$ momentarily drops during a period from the time t4b to t4c, the MOSFET 28 is turned into the ON state. A MOSFET 25 is then turned into the OFF state.

As described above, with the fourth exemplary embodiment, the voltage $V_o$ applied to the load 22 becomes identical to the voltage $V_c$ of the capacitor 21 during the hit period (from the time t1 to t2), so that the time length for the backup by the capacitor 21 does not become shorter. For this reason, even if the load 22 is of low voltage specification (a power supply voltage is required to be, for example, 3.3V±10%, namely, a tolerance range of 2.97 to 3.63V), it would happen less than the third exemplary embodiment that the voltage $V_o$ will drop below the lower limit value of the tolerance range. Therefore a normal operation is ensured.

While this invention has been particularly shown and described with reference to exemplary embodiments thereof, it will be understood by those skilled in the art that various changes in form and details may be made therein without departing from the spirit and scope of the invention as defined by the appended claims. The above-described exemplary embodiments should be considered in a descriptive sense only and are not for purposes of limitation. Therefore, the scope of the invention is defined not by the detailed description of the invention but by the appended claims, and all differences within the scope will be construed as being included in the present invention.

For example, a depletion MOSFET or a bipolar transistor in combination with a diode may be substituted for the MOSFETs 25, 28, respectively. In that case, the operations and effects similar to those for the exemplary embodiments described in the foregoing are obtained. Further, the current transformer 23A in FIG. 9 may be made up of two current transformers. Still further, with the respective exemplary embodiments described in the foregoing, the MOSFET 25 is connected to a terminal on the minus side of the DC power unit 1, however, even if a p-channel MOSFET is connected to a terminal on the plus side of the DC power unit 1, operations and effects similar to those for the exemplary embodiments described in the foregoing are obtained. Yet further, a Schottky barrier diode having a forward voltage smaller than those of the parasitic diodes 25a, 28a, respectively, may be parallel-connected thereto. By so doing, there will be improvement on time delay in transition from the OFF state to the ON state of the MOSFETs 25, 28, respectively.

What we claim is:

1. A discharging prevention circuit, comprising:
   a first power feed line;
   a second power line;
   a capacitor;
   a current detector; and
   a switch;
   wherein the first and second power lines are isolated from frame ground,
   wherein the first and second power lines directly or indirectly connect a power feed line to a load,
   wherein the capacitor and the current detector are directly or indirectly connected in series between the first and second power lines,
   wherein the switch is disposed in the first or second power line,
   wherein the current detector detects at least charging direct current to the capacitor and discharging direct current from the capacitor, and
   wherein if the current detector detects discharging direct current from the capacitor in case of momentary drops of power feed lines, the switch acts to stop current flow between the capacitor and the power feed line through the switch.

2. The circuit of claim 1, further comprising:
   a controller;
   wherein if the current detector detects discharging current from the capacitor, the controller receives a control signal from the current detector and controls the switch to stop the current flow between the capacitor and the power feed line through the switch.

3. The circuit of claim 2, wherein the current detector comprises a current transformer.

4. The circuit of claim 1,
   (a) after the switch acts to stop current flow between the capacitor and the power feed line through the switch,
   (b) after the current detector then detects charging current to the capacitor, and
   (c) after subsequently waiting a predetermined period of time, the switch acts to allow current flow between the capacitor and the power feed line through the switch.

5. The circuit of claim 1, further comprising:
   a controller;
   wherein if the current detector detects discharging current from the capacitor, the controller receives a first control signal from the current detector and controls the switch to stop current flow from the capacitor and the power feed line through the switch, and
   wherein if the current detector detects charging to the capacitor, the controller receives a second control signal from the current detector and controls the switch to allow current flow between the capacitor and the power feed line through the switch.

6. The circuit of claim 5, further comprising:
   a rush-current prevention circuit;
   wherein the capacitor, the current detector and the rush-current prevention circuit are directly or indirectly connected in series in any order between the first and second power lines.

7. The circuit of claim 6, wherein the rush-current prevention circuit comprises:
   a resistor; and
   a diode;
   wherein the resistor and the diode are disposed in parallel.

8. The circuit of claim 6, wherein the rush-current prevention circuit comprises:
   a supplemental switch; and
   a resistor;
   wherein the supplemental switch and the resistor are disposed in parallel.

9. The circuit of claim 8;
   wherein if the current detector detects charging current to the capacitor, the controller receives a third control signal from the current detector and controls the supplemental switch to stop current flow through the supplemental switch, and
   wherein if the current detector detects discharging current from the capacitor, the controller receives a fourth control signal from the current detector and controls the supplemental switch to allow current flow through the supplemental switch.

10. A discharging prevention circuit, comprising:
    a first power line;
    a second power line;
    a capacitor;
    current detecting means; and
    switching means;
    wherein the first and second power lines are isolated from frame ground,
    wherein the first and second power lines directly or indirectly connect a power feed line to a load,
    wherein the capacitor and the current detecting means are directly or indirectly connected in series between the first and second power lines,
    wherein the switching means is disposed in the first or second power line, wherein if the current detecting means detects at least charging direct current to the capacitor and discharging direct current from the capacitor, and wherein if the current detecting means detects discharging direct current from the capacitor in case of momentary drops of power feed lines, the switching means acts to stop current flow between the capacitor and the power feed line through the switching means.

11. The circuit of claim 10, further comprising:

controlling means;

wherein if the current detecting means detects discharging current from the capacitor, the controlling means receives a control signal from the current detecting means and controls the switching means to stop the current flow between the capacitor and the power feed line through the switching means.

12. The circuit of claim 11, wherein the current detecting means comprises a current transformer.

13. The circuit of claim 10, wherein:
(a) the switching means acts to stop current flow between the capacitor and the power feed line through the switching means,
(b) after the current detecting means then detects charging current to the capacitor, and
(c) after subsequently waiting a predetermined period of time, the switching means acts to allow current flow between the capacitor and the power feed line through the switching means.

14. The circuit of claim 10, further comprising:

controlling means;

wherein if the current detecting means detects discharging current from the capacitor, the controlling means receives a first control signal from the current detecting means and controls the switching means to stop current flow between the capacitor and the power feed line through the switching means, and wherein if the current detecting means detects charging to the capacitor, the controlling means receives a second control signal from the current detecting means and controls the switching means to allow current flow between the capacitor and the power feed line through the switching means.

15. The circuit of claim 14, further comprising:

rush-current prevention circuit;

wherein the capacitor, the current detecting means and the rush-current prevention circuit are directly or indirectly connected in series in any order between the first and second power lines.

16. The circuit of claim 15, wherein the rush-current prevention circuit comprises:

a resistor; and a diode;

wherein the resistor and the diode are disposed in parallel.

17. The circuit of claim 15, wherein the rush-current prevention circuit comprises:

supplemental switching means; and a resistor;

wherein the supplemental switching means and the resistor are disposed in parallel.

18. The circuit of claim 17;

wherein if the current detecting means detects charging current flow to the capacitor, the controlling means receives a third control signal from the current detecting means and controls the supplemental switching means to stop current flow through the supplemental switching means, and wherein if the current detecting means detects discharging current from the capacitor, the controlling means receives a fourth control signal from the current detecting means and controls the supplemental switching means to allow current flow through the supplemental switching means.

19. Electronic equipment comprising:

a load; and a discharge prevention circuit, wherein the discharging prevention circuit comprises:

a first power line;

a second power line;

a capacitor;

a current detector; and a switch;

wherein the first and second power lines are isolated from frame ground, wherein if the first and second power lines directly or indirectly connect a power feed line to a load, wherein the capacitor and the current detector are directly or indirectly connected in series between the first and second power lines, wherein the switch is disposed in the first or second power line, wherein the current detector detects at least charging direct current to the capacitor and discharging direct current from the capacitor, and wherein if the current detector detects discharging current from the capacitor in case of momentary drops of power feed lines, the switch acts to stop current flow between the capacitor and the power feed line through the switch.

20. The equipment of claim 19, further comprising:

a controller;

wherein if the current detector detects discharging current from the capacitor, the controller receives a control signal from the current detector and controls the switch to stop the current flow between the capacitor and the power feed line through the switch.

21. The circuit of claim 1, wherein the capacitor and the current detector are connected at a node only with each other.

22. The circuit of claim 10, wherein the capacitor and the current detector are connected at a node only with each other.

23. The circuit of claim 19, wherein the capacitor and the current detector are connected at a node only with each other.

* * * * *